(12) United States Patent
Foubert et al.

(10) Patent No.: US 7,980,590 B2
(45) Date of Patent: Jul. 19, 2011

(54) INFLATABLE PERSONAL RESTRAINT SYSTEMS HAVING WEB-MOUNTED INFLATORS AND ASSOCIATED METHODS OF USE AND MANUFACTURE

(75) Inventors: Daniel Nick Foubert, Maricopa, AZ (US); Kevin Keeslar, Chandler, AZ (US)

(73) Assignee: AmSafe, Inc., Phoenix, AZ (US)

( * ) Notice: Subject to any disclaimer, the term of this patent is extended or adjusted under 35 U.S.C. 154(b) by 379 days.

(21) Appl. No.: 12/051,768

(22) Filed: Mar. 19, 2008

(65) Prior Publication Data
US 2009/0236828 A1  Sep. 24, 2009

(51) Int. Cl.
*B60R 21/18* (2006.01)
(52) U.S. Cl. ..................... 280/733; 280/801.1
(58) Field of Classification Search ............... 280/733, 280/730.1, 801.1, 808
See application file for complete search history.

(56) References Cited

U.S. PATENT DOCUMENTS

| | | | |
|---|---|---|---|
| 3,430,979 A | 3/1969 | Terry et al. | |
| 3,682,498 A | 8/1972 | Rutzki et al. | |
| 3,706,463 A | 12/1972 | Lipkin | |
| 3,730,583 A | 5/1973 | Colovas et al. | |
| 3,756,620 A | 9/1973 | Radke | |
| 3,801,156 A | 4/1974 | Granig et al. | |
| 3,820,842 A * | 6/1974 | Stephenson | 280/733 |
| 3,841,654 A | 10/1974 | Lewis | |
| 3,865,398 A * | 2/1975 | Woll | 280/733 |
| 3,866,940 A | 2/1975 | Lewis | |
| 3,888,503 A | 6/1975 | Hamilton | |
| 3,897,081 A | 7/1975 | Lewis | |
| 3,905,615 A * | 9/1975 | Schulman | 280/730.1 |
| 3,933,370 A | 1/1976 | Abe et al. | |
| 3,948,541 A | 4/1976 | Schulman | |
| 3,970,329 A | 7/1976 | Lewis | |
| 3,971,569 A | 7/1976 | Abe et al. | |
| 4,107,604 A | 8/1978 | Bernier | |
| 4,437,628 A * | 3/1984 | Schwartz | 244/122 AG |
| 4,565,535 A | 1/1986 | Tassy | |
| 4,611,491 A | 9/1986 | Brown et al. | |
| 4,657,516 A | 4/1987 | Tassy | |
| 4,722,573 A | 2/1988 | Komohara et al. | |
| 4,765,569 A | 8/1988 | Higgins | |
| 4,842,299 A | 6/1989 | Okamura et al. | |

(Continued)

FOREIGN PATENT DOCUMENTS

DE  4116162  11/1992

(Continued)

OTHER PUBLICATIONS

Non-Final Office Action; U.S. Appl. No. 12/057,295; Date of Mailing: May 28, 2009, 10 pages.

(Continued)

*Primary Examiner* — Paul N Dickson
*Assistant Examiner* — Timothy D Wilhelm
(74) *Attorney, Agent, or Firm* — Perkins Coie LLP

(57) ABSTRACT

Inflatable restraint systems for restraining an occupant in a vehicle are disclosed herein. An inflatable restraint system configured in accordance with one embodiment of the invention includes an airbag carried by a web. The web has an end portion coupled to a vehicle and is configured to extend around a portion of the occupant. The restraint system further includes a gas source that is also carried by the web. The gas source is operably coupled to the airbag to inflate the airbag in the event of a rapid deceleration or other dynamic event.

17 Claims, 7 Drawing Sheets

U.S. PATENT DOCUMENTS

| | | | |
|---|---|---|---|
| 4,971,354 A | 11/1990 | Kim | |
| 4,987,783 A | 1/1991 | D'Antonio et al. | |
| 4,995,638 A | 2/1991 | Shinto et al. | |
| 4,995,640 A | 2/1991 | Saito et al. | |
| 5,026,305 A | 6/1991 | Del Guidice et al. | |
| 5,062,662 A | 11/1991 | Cameron | |
| 5,062,663 A | 11/1991 | Satoh et al. | |
| 5,161,821 A | 11/1992 | Curtis | |
| 5,162,006 A | 11/1992 | Yandle, II | |
| 5,183,288 A | 2/1993 | Inada et al. | |
| 5,184,844 A | 2/1993 | Goor | |
| 5,194,755 A | 3/1993 | Rhee et al. | |
| 5,199,739 A | 4/1993 | Fujiwara et al. | |
| 5,288,104 A | 2/1994 | Chen et al. | |
| 5,299,827 A | 4/1994 | Igawa et al. | |
| 5,324,071 A | 6/1994 | Gotomyo et al. | |
| 5,335,937 A | 8/1994 | Uphues et al. | |
| 5,335,939 A | 8/1994 | Kuriyama et al. | |
| 5,375,875 A | 12/1994 | DiSalvo et al. | |
| 5,400,867 A | 3/1995 | Muller et al. | |
| 5,411,289 A | 5/1995 | Smith et al. | |
| 5,456,491 A | 10/1995 | Chen et al. | |
| 5,465,999 A | 11/1995 | Tanaka et al. | |
| 5,470,103 A | 11/1995 | Vaillancourt et al. | |
| 5,472,231 A | 12/1995 | France | |
| 5,473,111 A | 12/1995 | Hattori et al. | |
| 5,485,041 A | 1/1996 | Meister | |
| 5,492,360 A | 2/1996 | Logeman et al. | |
| 5,499,840 A | 3/1996 | Nakano et al. | |
| 5,597,178 A | 1/1997 | Hardin, Jr. | |
| 5,609,363 A | 3/1997 | Finelli | |
| 5,672,916 A | 9/1997 | Mattes et al. | |
| 5,734,318 A | 3/1998 | Nitschke et al. | |
| 5,752,714 A | 5/1998 | Pripps et al. | |
| 5,758,900 A * | 6/1998 | Knoll et al. | 280/733 |
| 5,765,869 A | 6/1998 | Huber | |
| 5,772,238 A | 6/1998 | Breed et al. | |
| 5,803,489 A | 9/1998 | Nusshor et al. | |
| 5,839,753 A | 11/1998 | Yaniv et al. | |
| 5,851,055 A | 12/1998 | Lewis | |
| 5,863,065 A | 1/1999 | Boydston et al. | |
| 5,868,421 A | 2/1999 | Eyrainer et al. | |
| 5,871,230 A | 2/1999 | Lewis | |
| 5,886,373 A | 3/1999 | Hosogi et al. | |
| 5,906,391 A | 5/1999 | Weir et al. | |
| 5,924,726 A | 7/1999 | Pan et al. | |
| 5,927,748 A | 7/1999 | O'Driscoll | |
| 5,947,513 A | 9/1999 | Lehto | |
| 5,975,565 A | 11/1999 | Cuevas | |
| 5,984,350 A | 11/1999 | Hagan et al. | |
| 5,988,438 A | 11/1999 | Lewis et al. | |
| RE36,587 E | 2/2000 | Tanaka et al. | |
| 6,019,388 A | 2/2000 | Okazaki et al. | |
| 6,042,139 A | 3/2000 | Knox | |
| RE36,661 E | 4/2000 | Tanaka et al. | |
| 6,059,312 A | 5/2000 | Staub et al. | |
| 6,065,772 A | 5/2000 | Yamamoto et al. | |
| 6,082,763 A | 7/2000 | Kokeguchi et al. | |
| 6,113,132 A | 9/2000 | Saslecov et al. | |
| 6,126,194 A | 10/2000 | Yaniv et al. | |
| 6,135,489 A | 10/2000 | Bowers | |
| 6,142,508 A | 11/2000 | Lewis | |
| 6,142,511 A | 11/2000 | Lewis | |
| 6,155,598 A | 12/2000 | Kutchey | |
| 6,158,765 A | 12/2000 | Sinnhuber et al. | |
| 6,168,195 B1 | 1/2001 | Okazaki et al. | |
| 6,224,097 B1 | 5/2001 | Lewis | |
| 6,254,121 B1 | 7/2001 | Fowler et al. | |
| 6,293,582 B1 | 9/2001 | Lewis | |
| 6,336,657 B1 | 1/2002 | Akaba et al. | |
| 6,378,898 B1 | 4/2002 | Lewis et al. | |
| 6,382,666 B1 | 5/2002 | Devonport | |
| 6,390,502 B1 | 5/2002 | Ryan et al. | |
| 6,406,058 B1 | 6/2002 | Devonport et al. | |
| 6,419,263 B1 * | 7/2002 | Busgen et al. | 280/733 |
| 6,425,601 B1 | 7/2002 | Lewis | |
| 6,439,600 B1 | 8/2002 | Adkisson | |
| 6,460,878 B2 | 10/2002 | Eckert et al. | |
| 6,547,273 B2 | 4/2003 | Grace et al. | |
| 6,557,887 B2 | 5/2003 | Wohllebe et al. | |
| 6,585,289 B1 | 7/2003 | Hammer et al. | |
| 6,616,177 B2 | 9/2003 | Thomas et al. | |
| 6,648,367 B2 | 11/2003 | Breed et al. | |
| 6,688,642 B2 | 2/2004 | Sollars, Jr. | |
| 6,705,641 B2 * | 3/2004 | Schneider et al. | 280/733 |
| 6,729,643 B1 * | 5/2004 | Bassick et al. | 280/730.1 |
| 6,739,264 B1 | 5/2004 | Hosey et al. | |
| 6,746,074 B1 | 6/2004 | Kempf et al. | |
| 6,749,220 B1 | 6/2004 | Wipasuramonton et al. | |
| 6,758,489 B2 | 7/2004 | Xu | |
| 6,764,097 B2 | 7/2004 | Kelley et al. | |
| 6,769,714 B2 | 8/2004 | Hosey et al. | |
| 6,776,434 B2 | 8/2004 | Ford et al. | |
| 6,779,813 B2 | 8/2004 | Lincoln et al. | |
| 6,789,818 B2 | 9/2004 | Gioutsos et al. | |
| 6,789,819 B1 | 9/2004 | Husby | |
| 6,789,821 B2 | 9/2004 | Zink et al. | |
| 6,793,243 B2 | 9/2004 | Husby | |
| 6,796,578 B2 | 9/2004 | White et al. | |
| 6,802,527 B2 | 10/2004 | Schmidt et al. | |
| 6,802,530 B2 | 10/2004 | Wipasuramonton et al. | |
| 6,808,198 B2 | 10/2004 | Schneider et al. | |
| 6,823,645 B2 | 11/2004 | Ford | |
| 6,824,163 B2 | 11/2004 | Sen et al. | |
| 6,825,654 B2 | 11/2004 | Pettypiece, Jr. et al. | |
| 6,830,263 B2 | 12/2004 | Xu et al. | |
| 6,830,265 B2 | 12/2004 | Ford | |
| 6,838,870 B2 | 1/2005 | Pettypiece, Jr. et al. | |
| 6,840,534 B2 | 1/2005 | Lincoln et al. | |
| 6,840,537 B2 | 1/2005 | Xu et al. | |
| 6,840,539 B2 | 1/2005 | Pettypiece, Jr. | |
| 6,843,503 B2 | 1/2005 | Ford | |
| 6,846,005 B2 | 1/2005 | Ford et al. | |
| 6,851,374 B1 | 2/2005 | Kelley et al. | |
| 6,857,657 B2 | 2/2005 | Canterberry et al. | |
| 6,860,509 B2 | 3/2005 | Xu et al. | |
| 6,863,301 B2 | 3/2005 | Ford et al. | |
| 6,869,101 B2 | 3/2005 | White et al. | |
| 6,871,872 B2 | 3/2005 | Thomas | |
| 6,871,874 B2 | 3/2005 | Husby et al. | |
| 6,874,814 B2 | 4/2005 | Hosey et al. | |
| 6,882,914 B2 | 4/2005 | Gioutsos et al. | |
| 6,886,856 B2 | 5/2005 | Canterberry et al. | |
| 6,886,858 B2 | 5/2005 | Olson | |
| 6,887,325 B2 | 5/2005 | Canterberry et al. | |
| 6,894,483 B2 | 5/2005 | Pettypiece, Jr. et al. | |
| 6,905,134 B2 | 6/2005 | Saiguchi et al. | |
| 6,908,104 B2 | 6/2005 | Canterberry et al. | |
| 6,923,483 B2 | 8/2005 | Curry et al. | |
| 6,929,283 B2 | 8/2005 | Gioutsos et al. | |
| 6,932,378 B2 | 8/2005 | Thomas | |
| 6,942,244 B2 | 9/2005 | Roychoudhury | |
| 6,951,350 B2 | 10/2005 | Heidorn et al. | |
| 6,951,532 B2 | 10/2005 | Ford | |
| 6,953,204 B2 | 10/2005 | Xu et al. | |
| 6,955,377 B2 | 10/2005 | Cooper et al. | |
| 6,957,828 B2 * | 10/2005 | Keeslar et al. | 280/733 |
| 6,962,363 B2 | 11/2005 | Wang et al. | |
| 6,962,364 B2 | 11/2005 | Ju et al. | |
| 6,974,154 B2 | 12/2005 | Grossert et al. | |
| 6,983,956 B2 | 1/2006 | Canterberry et al. | |
| 6,994,372 B2 | 2/2006 | Ford et al. | |
| 7,007,973 B2 | 3/2006 | Canterberry et al. | |
| 7,021,653 B2 | 4/2006 | Burdock et al. | |
| 7,029,024 B2 | 4/2006 | Baumbach | |
| 7,036,844 B2 | 5/2006 | Hammer et al. | |
| 7,044,500 B2 | 5/2006 | Kalandek et al. | |
| 7,044,502 B2 | 5/2006 | Trevillyan et al. | |
| 7,048,298 B2 | 5/2006 | Arwood et al. | |
| 7,052,034 B2 | 5/2006 | Lochmann et al. | |
| 7,055,856 B2 | 6/2006 | Ford et al. | |
| 7,063,350 B2 | 6/2006 | Steimke et al. | |
| 7,070,203 B2 | 7/2006 | Fisher et al. | |
| 7,081,692 B2 | 7/2006 | Pettypiece, Jr. et al. | |
| 7,090,246 B2 | 8/2006 | Lincoln et al. | |
| 7,107,133 B2 | 9/2006 | Fisher et al. | |
| 7,121,581 B2 | 10/2006 | Xu et al. | |

| | | |
|---|---|---|
| 7,121,628 B2 * | 10/2006 | Lo .................................. 297/482 |
| 7,131,662 B2 | 11/2006 | Fisher et al. |
| 7,131,664 B1 | 11/2006 | Pang et al. |
| 7,147,245 B2 | 12/2006 | Florsheimer et al. |
| 7,152,880 B1 | 12/2006 | Pang et al. |
| 7,163,236 B2 * | 1/2007 | Masuda et al. .................. 280/733 |
| 7,198,285 B2 | 4/2007 | Hochstein-Lenzen et al. |
| 7,198,293 B2 | 4/2007 | Olson |
| 7,213,836 B2 | 5/2007 | Coon et al. |
| 7,216,891 B2 | 5/2007 | Biglino et al. |
| 7,216,892 B2 | 5/2007 | Baumbach et al. |
| 7,222,877 B2 | 5/2007 | Wipasuramonton et al. |
| 7,255,364 B2 | 8/2007 | Bonam et al. |
| 7,261,315 B2 | 8/2007 | Hofmann et al. |
| 7,261,316 B1 | 8/2007 | Salmo et al. |
| 7,264,269 B2 | 9/2007 | Gu et al. |
| 7,267,361 B2 | 9/2007 | Hofmann et al. |
| 7,270,344 B2 | 9/2007 | Schirholz et al. |
| 7,278,656 B1 | 10/2007 | Kalandek |
| 7,281,733 B2 | 10/2007 | Pieruch et al. |
| 7,303,206 B2 | 12/2007 | Kippschull et al. |
| 7,318,599 B2 | 1/2008 | Magdun |
| 7,320,479 B2 | 1/2008 | Trevillyan et al. |
| 7,325,829 B2 | 2/2008 | Kelley et al. |
| 7,341,276 B2 | 3/2008 | Kelley et al. |
| 7,347,449 B2 | 3/2008 | Rossbach et al. |
| 7,350,806 B2 | 4/2008 | Ridolfi et al. |
| 7,354,064 B2 | 4/2008 | Block et al. |
| 7,367,590 B2 | 5/2008 | Koning et al. |
| 7,380,817 B2 | 6/2008 | Poli et al. |
| 7,390,018 B2 | 6/2008 | Ridolfi et al. |
| 7,398,994 B2 | 7/2008 | Poli et al. |
| 7,401,805 B2 | 7/2008 | Coon et al. |
| 7,401,808 B2 | 7/2008 | Rossbach et al. |
| 7,404,572 B2 | 7/2008 | Salmo et al. |
| 7,407,183 B2 | 8/2008 | Ford et al. |
| 7,431,332 B2 | 10/2008 | Wipasuramonton et al. |
| 7,452,002 B2 | 11/2008 | Baumbach et al. |
| 7,506,891 B2 | 3/2009 | Quioc et al. |
| 7,513,524 B2 | 4/2009 | Oota et al. |
| 7,533,897 B1 | 5/2009 | Xu et al. |
| 7,625,008 B2 | 12/2009 | Pang et al. |
| 7,658,400 B2 | 2/2010 | Wipasuramonton et al. |
| 7,658,406 B2 | 2/2010 | Townsend et al. |
| 7,658,407 B2 | 2/2010 | Ford et al. |
| 7,658,409 B2 | 2/2010 | Ford et al. |
| 7,665,761 B1 * | 2/2010 | Green et al. ....................... 280/733 |
| 7,703,796 B2 | 4/2010 | Manire et al. |
| 7,708,312 B2 | 5/2010 | Kalandek |
| 7,753,402 B2 | 7/2010 | Volkmann et al. |
| 7,789,418 B2 | 9/2010 | Wipasuramonton et al. |
| 2001/0048215 A1 | 12/2001 | Breed et al. |
| 2002/0011723 A1 | 1/2002 | Lewis |
| 2002/0024200 A1 | 2/2002 | Eckert et al. |
| 2002/0067031 A1 * | 6/2002 | Busgen et al. .................. 280/733 |
| 2002/0101067 A1 | 8/2002 | Breed |
| 2002/0125700 A1 | 9/2002 | Adkisson |
| 2002/0125701 A1 * | 9/2002 | Devonport ....................... 280/733 |
| 2002/0140209 A1 | 10/2002 | Waid et al. |
| 2003/0168837 A1 * | 9/2003 | Schneider et al. ............... 280/733 |
| 2004/0164532 A1 | 8/2004 | Heidorn et al. |
| 2004/0178614 A1 | 9/2004 | Countryman et al. |
| 2004/0188988 A1 | 9/2004 | Wipasuramonton et al. |
| 2005/0006884 A1 | 1/2005 | Cooper et al. |
| 2005/0146119 A1 | 7/2005 | Ford et al. |
| 2005/0212270 A1 | 9/2005 | Wipasuramonton et al. |
| 2005/0218635 A1 | 10/2005 | Wipasuramonton et al. |
| 2005/0248135 A1 | 11/2005 | Poli et al. |
| 2006/0108775 A1 | 5/2006 | Schirholz et al. |
| 2006/0119084 A1 | 6/2006 | Coon et al. |
| 2006/0175816 A1 | 8/2006 | Spencer et al. |
| 2006/0186644 A1 | 8/2006 | Manire et al. |
| 2006/0220360 A1 | 10/2006 | Ridolfi et al. |
| 2006/0255570 A1 | 11/2006 | Wipasuramonton et al. |
| 2007/0001435 A1 | 1/2007 | Gray et al. |
| 2007/0001437 A1 | 1/2007 | Wall et al. |
| 2007/0013175 A1 * | 1/2007 | Suyama et al. ................. 280/733 |
| 2007/0075534 A1 | 4/2007 | Kelley et al. |
| 2007/0075535 A1 | 4/2007 | Trevillyan et al. |
| 2007/0075536 A1 | 4/2007 | Kelley et al. |
| 2007/0085309 A1 | 4/2007 | Kelley et al. |
| 2007/0108753 A1 | 5/2007 | Pang et al. |
| 2007/0138775 A1 | 6/2007 | Rossbach et al. |
| 2007/0138776 A1 | 6/2007 | Rossbach et al. |
| 2007/0152428 A1 | 7/2007 | Poli et al. |
| 2007/0182137 A1 * | 8/2007 | Hiroshige et al. .............. 280/733 |
| 2007/0200329 A1 | 8/2007 | Ma |
| 2007/0222189 A1 | 9/2007 | Baumbach et al. |
| 2007/0241223 A1 | 10/2007 | Boelstler et al. |
| 2008/0018086 A1 | 1/2008 | Ford et al. |
| 2008/0054602 A1 | 3/2008 | Yang |
| 2008/0084050 A1 | 4/2008 | Volkmann et al. |
| 2008/0088118 A1 | 4/2008 | Wipasuramonton et al. |
| 2008/0106074 A1 | 5/2008 | Ford |
| 2009/0020032 A1 | 1/2009 | Trevillyan |
| 2009/0020197 A1 | 1/2009 | Hosey |
| 2009/0051149 A1 | 2/2009 | Kalandek et al. |
| 2009/0051150 A1 | 2/2009 | Murakami |
| 2009/0058052 A1 | 3/2009 | Ford et al. |
| 2009/0066063 A1 * | 3/2009 | Mical ............................ 280/733 |
| 2009/0230662 A9 * | 9/2009 | Itoga ............................. 280/733 |
| 2010/0066060 A1 | 3/2010 | Kalandek |
| 2010/0164208 A1 | 7/2010 | Kalandek |

FOREIGN PATENT DOCUMENTS

| | | |
|---|---|---|
| DE | 4211209 | 10/1993 |
| DE | 19742151 | 4/1998 |
| DE | 10041042 | 5/2001 |
| EP | 0639481 | 2/1995 |
| EP | 0765780 | 4/1997 |
| EP | 1101660 | 5/2001 |
| FR | 2703011 | 9/1994 |
| GB | 2306876 | 5/1997 |
| GB | 2368050 | 4/2002 |
| GB | 2410009 | 7/2005 |
| JP | 63258239 | 10/1988 |
| JP | 1083436 | 3/1989 |
| JP | 11189117 | 7/1999 |
| WO | WO-8807947 | 10/1988 |
| WO | WO-9939940 | 8/1999 |
| WO | WO-9942336 | 8/1999 |
| WO | WO-0100456 | 1/2001 |
| WO | WO-0166413 | 9/2001 |

OTHER PUBLICATIONS

International Search Report and Written Opinion; International Patent Application No. PCT/US2008/059587; Filed Jul. 4, 2008; Applicant: AmSafe, Inc.; Mailed on Sep. 12, 2008.

* cited by examiner

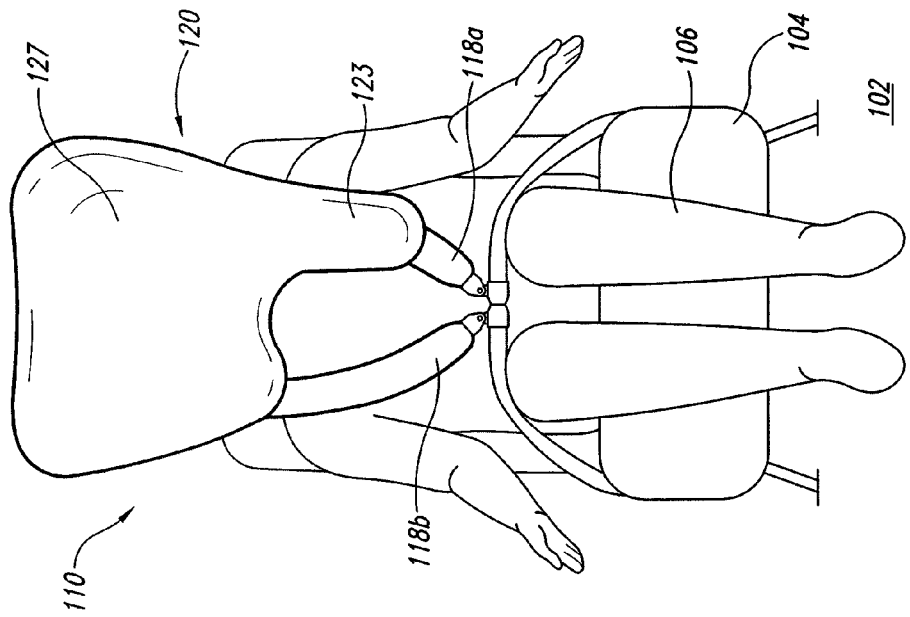
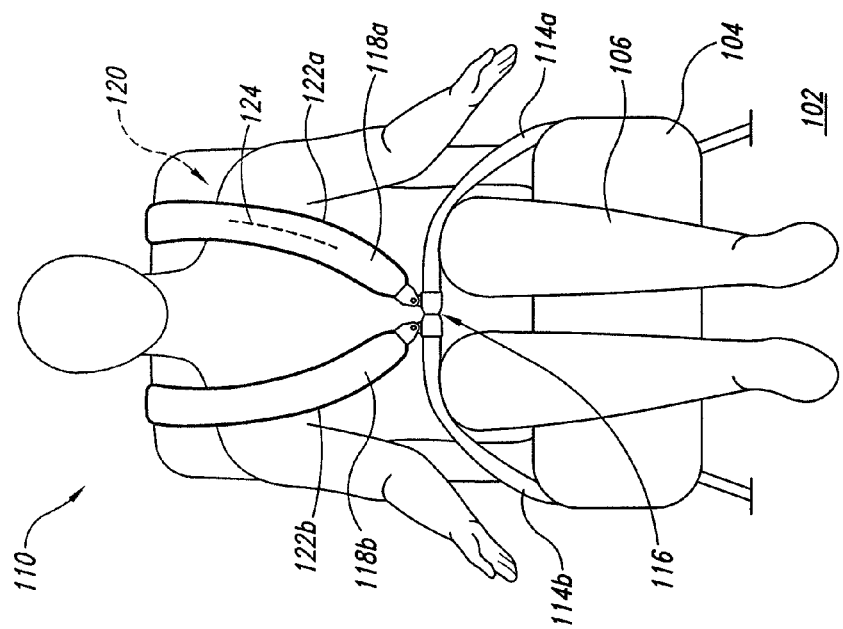
Fig. 1A
Fig. 1B

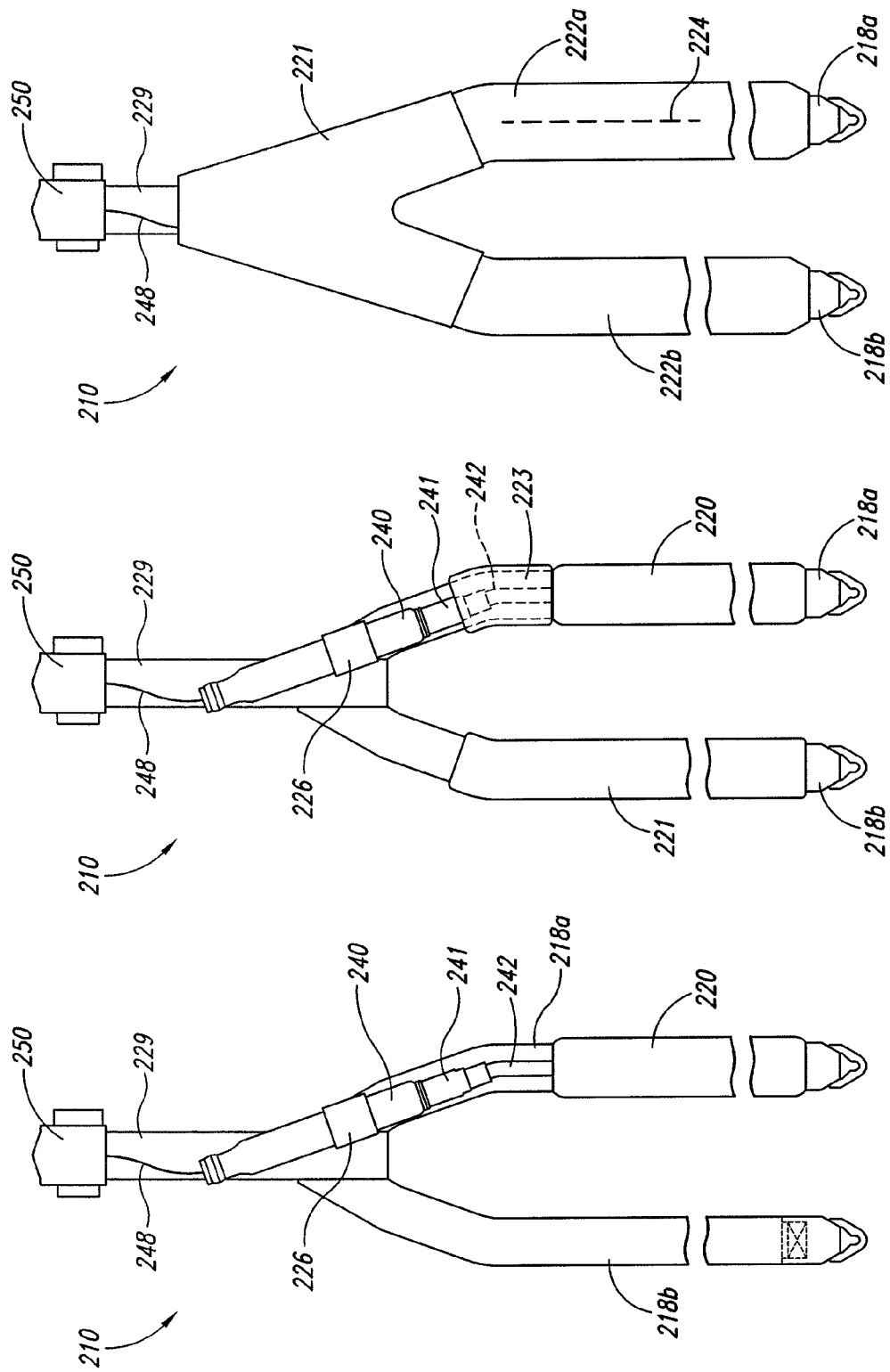

INFLATABLE PERSONAL RESTRAINT SYSTEMS HAVING WEB-MOUNTED INFLATORS AND ASSOCIATED METHODS OF USE AND MANUFACTURE

TECHNICAL FIELD

The following disclosure relates generally to inflatable personal restraint systems for use in vehicles.

BACKGROUND

Airbags can provide protection for occupants in many different types of vehicles during accidents or collisions. In cars, for example, airbags can deploy from the steering column, dashboard, side panel, etc., to protect the driver and/or passenger(s). During a sudden deceleration of the car, such as in a collision, the airbag rapidly inflates and deploys in front of, or to the side of, the driver and/or passenger(s).

Although a seat belt will generally restrain a person during an accident, an airbag can provide additional protection. An airbag positioned in the steering column, for example, can expand in front of the driver to cushion his torso and head. The airbag can prevent the driver's head from hitting the steering wheel, and can also reduce the likelihood of whiplash. Airbags can also be deployed to provide protection from side impact collisions.

Although the airbags described above are common in automobiles, other types of airbags are used in other types of vehicles. These other types of airbags are useful because airbags that deploy from a specific location in an automobile (e.g., from the steering column) may not be effective in other types of vehicles, or for occupants in different locations in a vehicle. To accommodate different vehicles and different occupant positions, airbags have been developed that deploy from seat belts. For example, such airbags can deploy from a lap belt or shoulder belt to provide additional protection during a sudden deceleration. These seat belt-deployable airbags can be used in various types of vehicles, including over road vehicles, aircraft, etc.

SUMMARY

The following summary is provided for the benefit of the reader only, and is not intended to limit the invention as set forth by the claims in any way.

The present disclosure is directed generally to personal restraint systems for restraining an occupant in a vehicle. A personal restraint system configured in accordance with one aspect of the disclosure includes an airbag that is deployable from a web (e.g., a seat belt), strap, or other form of personal restraint feature. The web is configured to extend around at least a portion of an occupant seated in the vehicle (e.g., over the occupant's shoulder or around the occupant's waist). The restraint system further includes a gas source that is carried by the web and configured to inflate the airbag in the event of a sudden deceleration or similar dynamic event.

A personal restraint system configured in accordance with another aspect of the disclosure includes an airbag that is deployable from a web that extends around at least a portion of an occupant of a vehicle. An end portion of the web is operably coupled to a web retractor. The web retractor is attached to an interior portion of a vehicle and configured to adjust the fit of the web around the occupant. The web carries an inflator, and a conduit extends along a portion of the web and operably couples the airbag to the inflator. The inflator is operably coupled to a sensor carried by the vehicle. The sensor transmits a signal to the inflator in response to a rapid deceleration (or other similar dynamic event) of the vehicle. The inflator dispenses gas into the airbag through the conduit in response to the signal.

BRIEF DESCRIPTION OF THE DRAWINGS

FIGS. 1A and 1B are front views.

FIGS. 2A-2C are a series of top views of a personal restraint system configured in accordance with an embodiment of the disclosure.

DETAILED DESCRIPTION

The following disclosure describes various types of inflatable personal restraint systems and methods of making and using such restraint systems. Certain details are set forth in the following description and in FIGS. 1A-5 to provide a thorough understanding of various embodiments of the invention. Other details describing well-known structures and systems often associated with restraint systems, however, are not set forth below to avoid unnecessarily obscuring the description of the various embodiments of the invention.

Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Various embodiments of the invention can include structures other than those illustrated in the Figures and are expressly not limited to the structures shown in the Figures.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1. Moreover, the various elements and features illustrated in the Figures may not be drawn to scale.

Figure 1C:
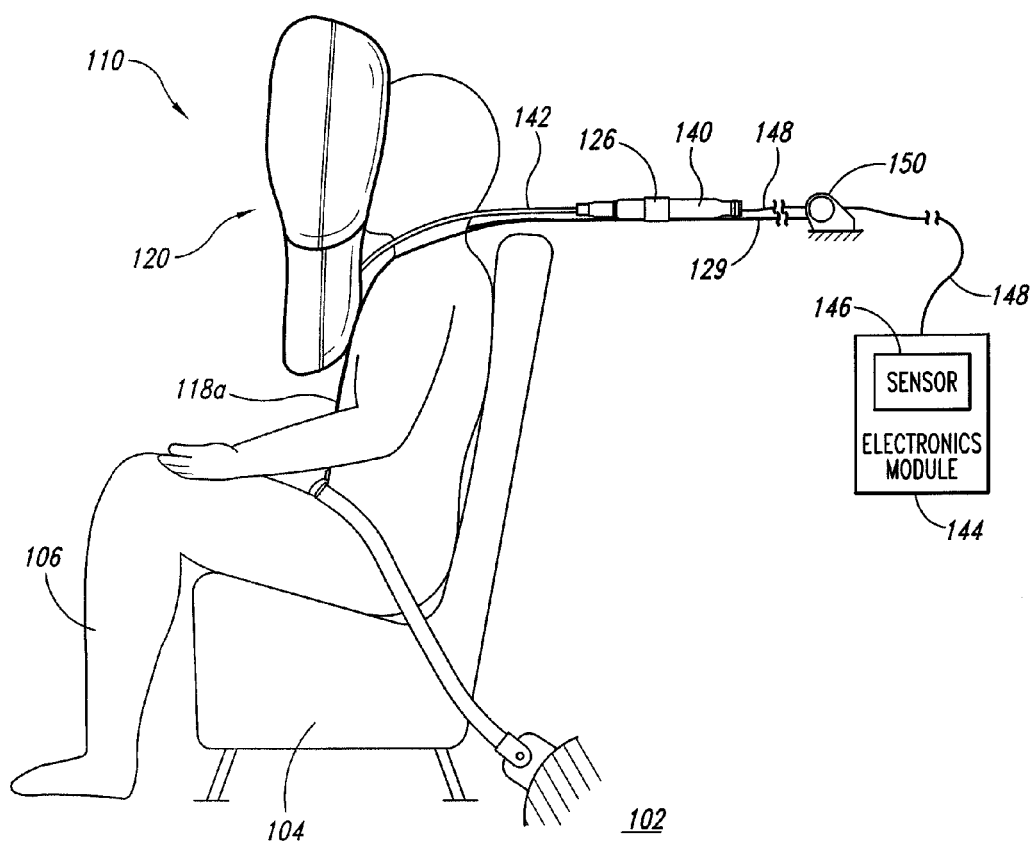
FIG. 1C is a side view, of a vehicle occupant positioned in a restraint system configured in accordance with an embodiment of the disclosure.

FIGS. 1A-1C illustrate a personal restraint system 110 configured in accordance with an embodiment of the disclosure in various stages of deployment. More specifically, FIGS. 1A and 1B are front views, and FIG. 1C is a side view, of an occupant 106 secured in a seat 104 by the restraint system 110. The seat 104 is secured in a vehicle 102, such as an aircraft. It should be understood, however, that the restraint system 110 can be used with any type of vehicle (e.g., ground vehicles, automobiles, military vehicles, aircraft, rotorcraft, watercraft, spacecraft, etc.). In one embodiment, for example, the restraint system 110 can be used in a personal and/or private aircraft.

Referring first to FIG. 1A, the restraint system 110 includes multiple belts or webs extending around the occupant 106 and connected to each other with a buckle assembly 116. As used herein, "webs" can be any type of flexible straps or belts, such as seat belts made from a woven material as is known in the art. For example, in the illustrated embodiment the restraint system 110 includes lap webs 114 (identified individually as a first lap web 114a and a second lap web 114b), as well as shoulder webs 118 (identified individually as a first shoulder web 118a and a second shoulder web 118b). Although the illustrated embodiment includes two lap webs 114 and two shoulder webs 118, in other embodiments the restraint system 110 can have other web configurations, including a different number of webs, different types of webs, etc. For example, the restraint system 110 can also include a crotch web operably coupled to the buckle assembly 116 to form a five-point restraint system. In other embodiments, a single lap web 114 and/or a single shoulder web 118 can also be used. Accordingly, the present invention is not limited to the particular web configurations disclosed herein.

Moreover, in various embodiments, the lap webs 114 and shoulder webs 118 can include features typically associated with conventional webs and safety belts. For example, the lap webs 114 and shoulder webs 118 can include flexible segments of a fixed length and/or adjustable length to accommodate different sized occupants. The distal ends of the webs can also be attached to the vehicle 102 and/or seat 104 with an inertial reel, retractor, or other device to automatically adjust the fit of the webs in response to movement of the occupant 106. In other embodiments, the shoulder webs 118 and/or lap webs 114 can be manually adjusted, static, etc.

In the embodiment illustrated in FIG. 1A, each shoulder web 118 carries an associated web cover 122 (identified individually as a first web cover 122a and a second web cover 122b). The first web cover 122a generally encloses and retains an uninflated airbag 120 that is carried by the first web 118a. The airbag 120 can be folded, rolled, stuffed, or otherwise contained in the first web cover 122a so that the first shoulder web 118a has a generally similar appearance to the second shoulder web 118b during normal use. The first web cover 122a includes a tear seam 124 or other type of weakened portion. When the airbag 120 is inflated, the first web cover 122a comes apart at the tear seam 124 to allow the airbag 120 to deploy from the first shoulder web 118a. As described in detail below, the restraint system 110 also includes a gas source or inflator 140 (e.g., a compressed gas canister, cylinder, etc.; FIG. 1C) carried by one or more of the shoulder webs 118. The inflator 140 is operably coupled to the airbag 120 and an electronics module 144 (FIG. 1C) to initiate and/or control deployment of the airbag 120.

In FIG. 1B the airbag 120 is shown in a fully deployed position from the first shoulder web 118a, thereby forming a deformable impact barrier for the upper torso and head of the occupant 106. In this embodiment, the inflated airbag 120 extends outwardly and laterally from the first shoulder web 118a in front of the occupant 106. The airbag 120 is configured to position itself in front of the occupant 106 and provide protection for a wide range of occupant sizes. In the illustrated embodiment, the airbag 120 has a generally inverted "L" shape, including a narrow lower portion 125 fixedly attached to the first shoulder web 118a, and an enlarged upper portion 127 positioned in front of the upper torso and head of the occupant 106. In other embodiments, however, the inflated airbag 120 can have other shapes and/or be deployed in other directions. For example, in certain embodiments, the airbag 120 can deploy toward the side of the head, shoulder, legs, lower torso, etc. of the occupant 106. Moreover, in other embodiments, the airbag 120 can deploy from other webs to securely restraint and/or protect the occupant 106. For example, although the airbag 120 of the illustrated embodiment deploys from the first shoulder web 118a, in other embodiments, one or more airbags can deploy from the second shoulder web 118b, either of the lap webs 114, and/or other webs.

FIG. 1C is a side view of the restraint system 110 of FIGS. 1A and 1B configured in accordance with an embodiment of the disclosure. In the illustrated embodiment, an end portion 129 of the first shoulder web 118a is operably coupled to a retractor 150 (e.g., an inertial reel) that is fixedly attached to a portion of the vehicle 102. The retractor 150 is configured to adjust the fit of the shoulder webs 118 around the occupant 106. Although the illustrated embodiment includes the retractor 150 positioned behind the seat 104 at the shoulder level of the occupant 106, in other embodiments the retractor 150 can be located in different positions. The shoulder webs 118 can also be attached to the vehicle 102 with an anchor or other type of fixed support instead of the retractor 150.

In the illustrated embodiment, the inflator 140 is carried on the first shoulder web 118a. As explained in greater detail below with reference to FIGS. 2A-2C, the inflator 140 can be positioned on one of the shoulder webs 118 between the retractor 150 and the airbag 120. In the illustrated embodiment, a looped portion or sleeve 126 at least partially secures and retains the inflator 140 in place on the first shoulder web 118a. The restraint system 110 can also include a cover or housing (not shown) positioned around the inflator 140 and corresponding web 118 to secure the inflator 140 in place.

A gas conduit or tube 142 extends adjacent to the first shoulder web 118a and operably couples the inflator 140 to the airbag 120. As explained below with reference to FIG. 3B, the inflator 140 can dispense gas into the airbag 120 via the gas tube 142 during a rapid deceleration or similar dynamic event (e.g., an impact, collision, acceleration, etc.). The restraint assembly 110 also includes an electrical link 148 (e.g., a wire, electrical line, retractile cord, connector, etc.) that operably couples the inflator 140 to the electronics module 144 (shown schematically). In the illustrated embodiment, the electrical link 148 is connected to the inflator 140 and extends along the first shoulder web 118a, through the retractor 150, to the electronics module 144. In other embodiments, however, the electrical link 148 can connect the inflator 140 to the electronics module 144 without passing through the retractor 150.

The electronics module 144 can include at least a deceleration sensor 146 (shown schematically) and associated electronics configured to detect a rapid deceleration of the vehicle 102 above a preset magnitude, and transmit a corresponding signal to the inflator 140 via the electrical link 148. In other embodiments, the electronics module 144 can be configured to detect other types of dynamic events, such as rapid accelerations for example, and transmit a corresponding signal to the inflator 140 in response to these sensed dynamic events. The signal causes the inflator 140 to automatically inflate the airbag 120. One of ordinary skill in the art will appreciate that the electronics module 144 can be positioned at different locations in the vehicle 102. In certain embodiments, for example, the electronics module 144 can be positioned in or on the back portion and/or bottom portion of the seat 104, behind the seat 104, above the occupant 106, etc.

In the embodiment illustrated in FIGS. 1A-1C, the restraint system 110 restrains the occupant 106 in the seat 104 and at least partially protects the occupant 106 during a rapid deceleration or other type of dynamic event. One advantage of this embodiment is that because the inflator 140 is carried by the first shoulder web 118a, the gas tube 142 extends a relatively short distance from the inflator 140 to the airbag 120, and as a result, the inflator 140 can rapidly inflate the airbag 120. Moreover, in this configuration the gas tube 142 is not required to pass through the retractor 150 or other anchor-type structure coupling the shoulder web 118 to the vehicle 102.

Another advantage of the illustrated embodiment is the impact protection provided by the airbag 120 extending in front of the occupant 106 from the first shoulder web 118a. The airbag 120 provides forward impact protection that can be specifically positioned for the upper torso and/or head of the occupant 106. Moreover, the inverted "L" shape of the airbag 120 allows the airbag 120 to deploy in front of the occupant 106 without interfering with the hands and/or arms of the occupant 106. For example, when the hands of the occupant 106 are positioned on the controls (e.g., flight controls, steering wheel, etc.) of a vehicle, the lower portion 125 of the airbag 120 can extend between the arms of the occupant 106 without removing the hands of the occupant 106 from the vehicle controls.

FIGS. 2A-2C are a series of top views illustrating various steps in the assembly of a personal restraint system 210 configured in accordance with an embodiment of the disclosure. Referring first to FIG. 2A, the restraint system 210 is generally similar in structure and function to the restraint system 110 described above with reference to FIGS. 1A-1C. For example, the restraint system 210 includes two shoulder webs 218 (identified individually as a first shoulder web 218a and a second shoulder web 218b). In the illustrated embodiment, however, an end portion of each of the shoulder webs 218 is attached to a main web 229. The main web 229 extends from the shoulder webs 218 and is operably coupled to a retractor 250 configured to adjust the fit of the shoulder webs 218 around an occupant (not shown in FIGS. 2A-2C). The restraint system 210 also includes an airbag 220 and an inflator 240 (e.g., a compressed gas canister, cylinder, etc.) which are carried by the first shoulder web 218a.

In the illustrated embodiment, the width of the folded airbag 220 is slightly greater than the width of the first shoulder web 218a. An electrical link 248 extends from the inflator 240 adjacent to a segment of the main web 229 to an electronics module that is at least generally similar in structure and function to the electronics module 144 described above with reference to FIG. 1C. A fitting or coupling 241 operably connects one end portion of a gas tube 242 to the inflator 240. A second end portion of the gas tube 242 is operably coupled to the airbag 220. In certain embodiments, the gas tube 142 can be a flexible fabric hose made from the same material as the airbag 120. In other embodiments, however, the gas tube 142 can be made from other suitable materials, including, for example, nylon, Kevlar, polyurethane, etc.

In the illustrated embodiment, the inflator 240 is at least partially held in position on the first shoulder web 218a by a loop of material or sleeve 226 attached (e.g., sewn) to the first shoulder web 218a. The sleeve 226 can be made from the same material as the shoulder webs 218. In other embodiments, however, the sleeve 226 can be made from other materials, such as a rigid or semi-rigid material or holder that is attached to the first shoulder web 218a. The sleeve 226 is configured to receive the inflator 240 and retain the inflator 240 in position on the first shoulder web 218a. For example, in embodiments where the inflator 240 includes a compressed gas cylinder, the sleeve 226 can have an inner diameter generally corresponding to the outer diameter of the compressed gas cylinder. In other embodiments, however, other components and/or structures can be used to retain the inflator 240 on the first shoulder web 218a. For example, a housing can receive the inflator 240 and be attached to the first shoulder web 218a. As described in more detail below, in other embodiments, the inflator 240 can be positioned at different locations and/or carried by other webs.

Referring next to FIG. 2B, a first cushion 221 is positioned over the second shoulder web 218b. The first cushion 221 can include fabric and/or foam padding that extends along a segment of the second shoulder web 218b and has a thickness and width that generally correspond to that of the airbag 220. A second cushion 223, which can be generally similar to the first cushion 221, is positioned over a corresponding portion of the first shoulder web 218a adjacent to the airbag 220. The second cushion 223 at least partially covers the gas tube 242 and also has a thickness and width that generally correspond to that of the airbag 220. In certain embodiments, the first cushion 221 and the second cushion 223 can generally encompass or surround the corresponding shoulder webs 218. In other embodiments, however, the first cushion 221 and the second cushion 223 can be positioned to one side of the corresponding shoulder webs 218.

In FIG. 2C, multiple covers are positioned over the shoulder webs 218 and main web 229 to conceal and/or protect the components carried by the webs. More specifically, a main cover 221 is positioned over the main web 229, inflator 240, coupling 241 and adjacent portions of the shoulder webs 218. The main cover 221 can have a generally "V" shape and at least partially hide the inflator 240, shoulder webs 218, and main web 229 from view. In certain embodiments, the main cover 221 can be releasably attached around the other components with, e.g., hook and loop fasteners, a zipper, buttons, etc. The main cover 221 also at least partially secures the inflator 240 in place on the main web 218a. As such, in operation, the inflator 240 is secured on the first shoulder web 218a in the sleeve 226 and at least partially retained in place with the main cover 221. A web cover 222 (identified individually as a first web cover 222a and a second web cover 222b) is positioned over each of the corresponding shoulder webs 218. In the embodiment illustrated in FIG. 2C, the first web cover 222a includes a tear seam 224, or other type of weakened portion, to allow the airbag 220 to deploy from the first shoulder web 218a through the first web cover 222a. In the embodiment illustrated in FIGS. 2A-2C, each of the covered shoulder webs 218 can have generally the same look and feel for use by an occupant. In other embodiments, however, one or more of the first cushion 221, second cushion 223, main cover 221, and/or web covers 222 may be omitted from the restraint system 210.

Figure 3A:
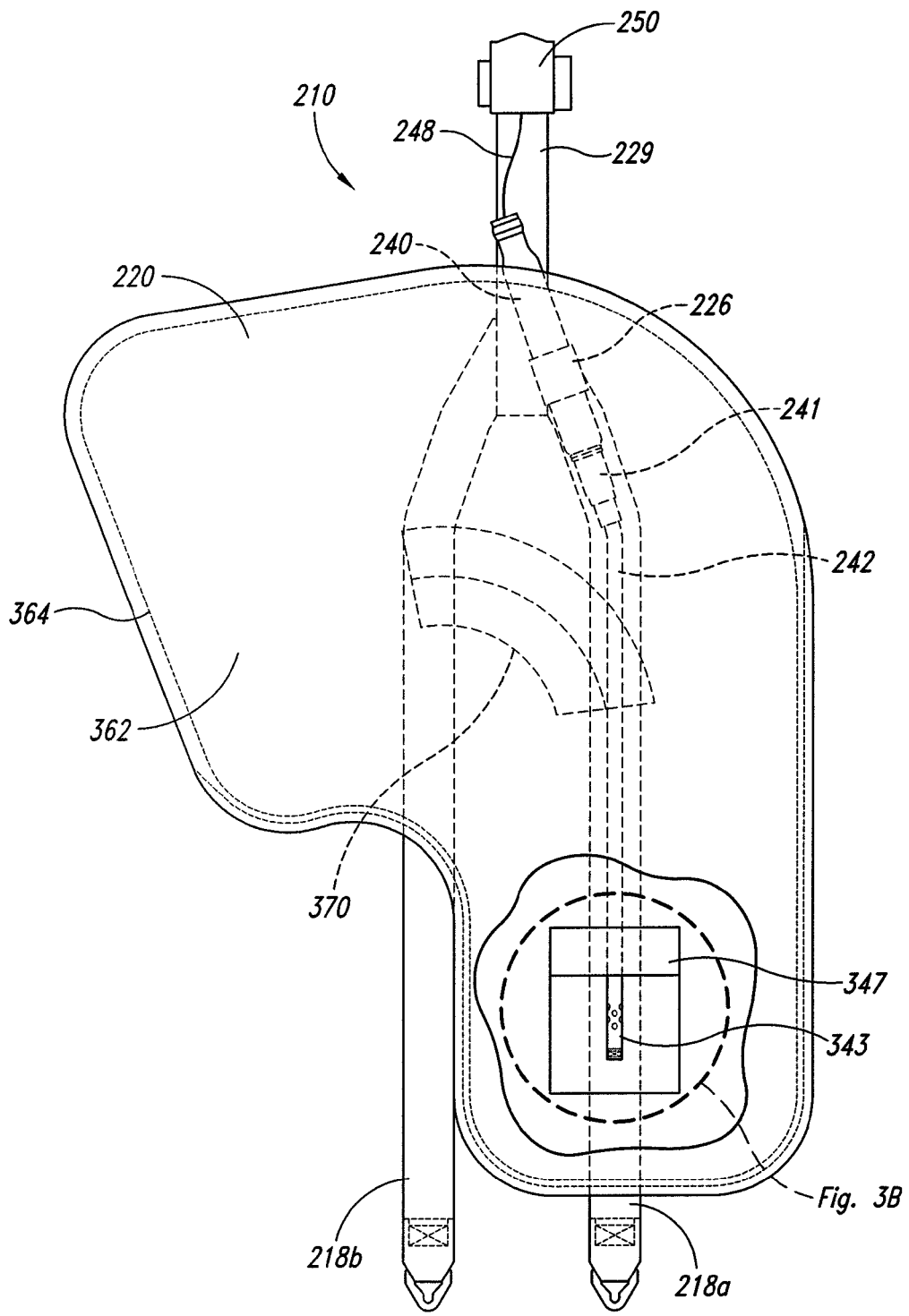
FIG. 3A is a top view of the personal restraint system of FIGS. 2A-2C, with an associated airbag in an unfolded state.

Turning next to FIG. 3A, the restraint system 210 is shown with the airbag 220 in an unfolded and/or inflated state. In the illustrated embodiment, the airbag 220 can be formed from a single piece of material 362 (e.g., nylon, silicone coated nylon, polyester, etc.) that is sewn or otherwise joined to itself along one or more edge seams 364. The airbag 220 can also include one or more optional tethers 370 positioned within the airbag 220. For example, in the illustrated embodiment, the tether 370 is sewn or otherwise fixedly attached to opposing interior surfaces of the airbag 220. The tether 370 can be made for the same material as the airbag 220 so that it can be folded and stored with the airbag 220 when uninflated. When the airbag 220 is inflated, the tether 370 can control the shape of the airbag 220 and/or the direction of inflation of the airbag 220. For example, referring back to FIGS. 1B and 1C, the enlarged upper portion 127 has a greater thickness relative to the lower portion 125 to cushion the upper torso and/or head of the occupant 106. In other embodiments, however, more than one tether can be used can be used at other locations within the airbag 220 to control the overall shape and/or deployment of the airbag 220. In still further embodiments, the tether 370 can be omitted.

Figure 3B:
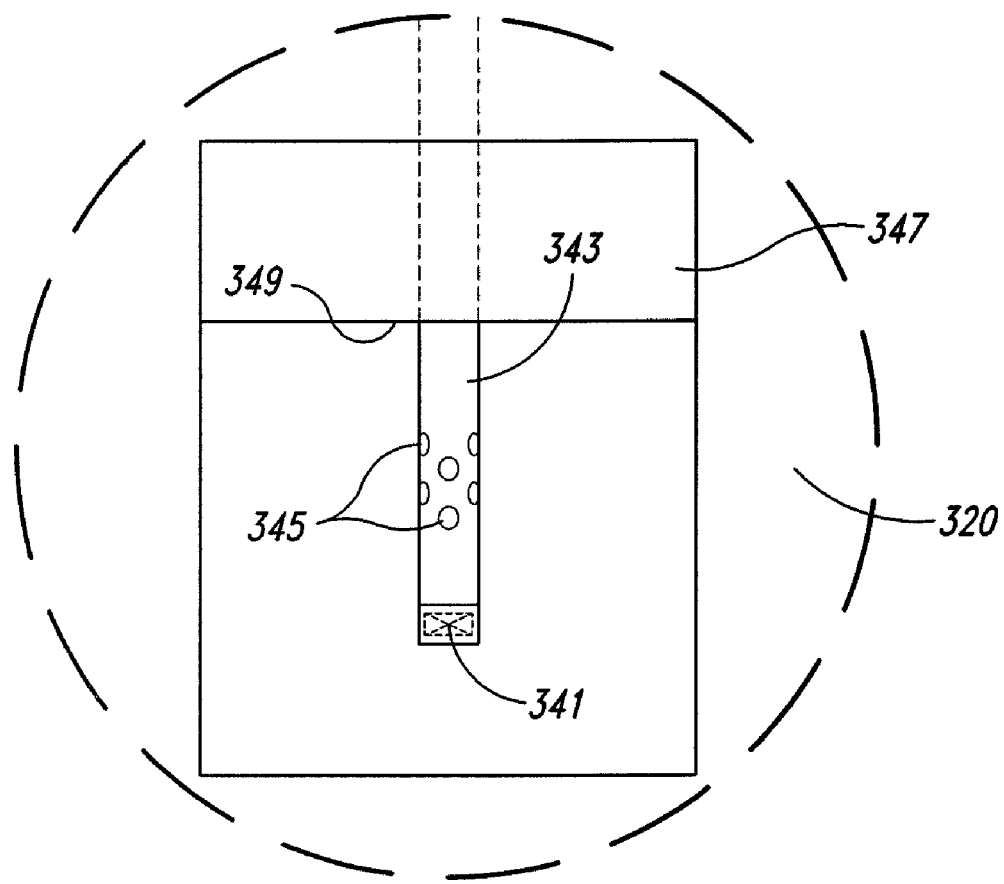
FIG. 3B is an enlarged view of detail 3B of FIG. 3A illustrating an end portion of a gas tube coupled to the airbag.

In the illustrated embodiment, an end portion 343 of the gas tube 242 enters the interior of the airbag 220 through a reinforced portion 347 (e.g., a material doubler). As shown in FIG. 3B, which is an enlarged view of detail 3B of FIG. 3A, the end portion 343 of the gas tube 242 enters the airbag 220 between layers of material of the reinforced portion 347 at a fold line 349. In certain embodiments, the reinforced portion 347 does not form an air tight seal around the end portion 343, so that the airbag 220 can vent from the opening 349 after the airbag 220 is deployed. In other embodiments, however, the reinforced portion 347 can form a seal around the end portion 343 of the gas tube 242, and the airbag 220 can include vents and/or other outlets at other locations for venting.

In the illustrated embodiment, the end portion 343 is configured to dispense gas from the inflator 240 into the airbag 220. More specifically, the end portion 343 includes a plurality of gas passages or openings 345 that allow gas to flow into the airbag 220 upon activation of the inflator 240. A tip segment 341 of the end portion 343 is sewn or otherwise fixedly attached to the airbag 220 and the corresponding first shoulder web 218a to secure the end portion 343 of the gas tube 242 inside the airbag 220. In other embodiments, the end portion 343 can have other configurations for dispensing gas into the airbag 220, including, for example, a single opening, openings with different shapes, etc.

Figure 3C:
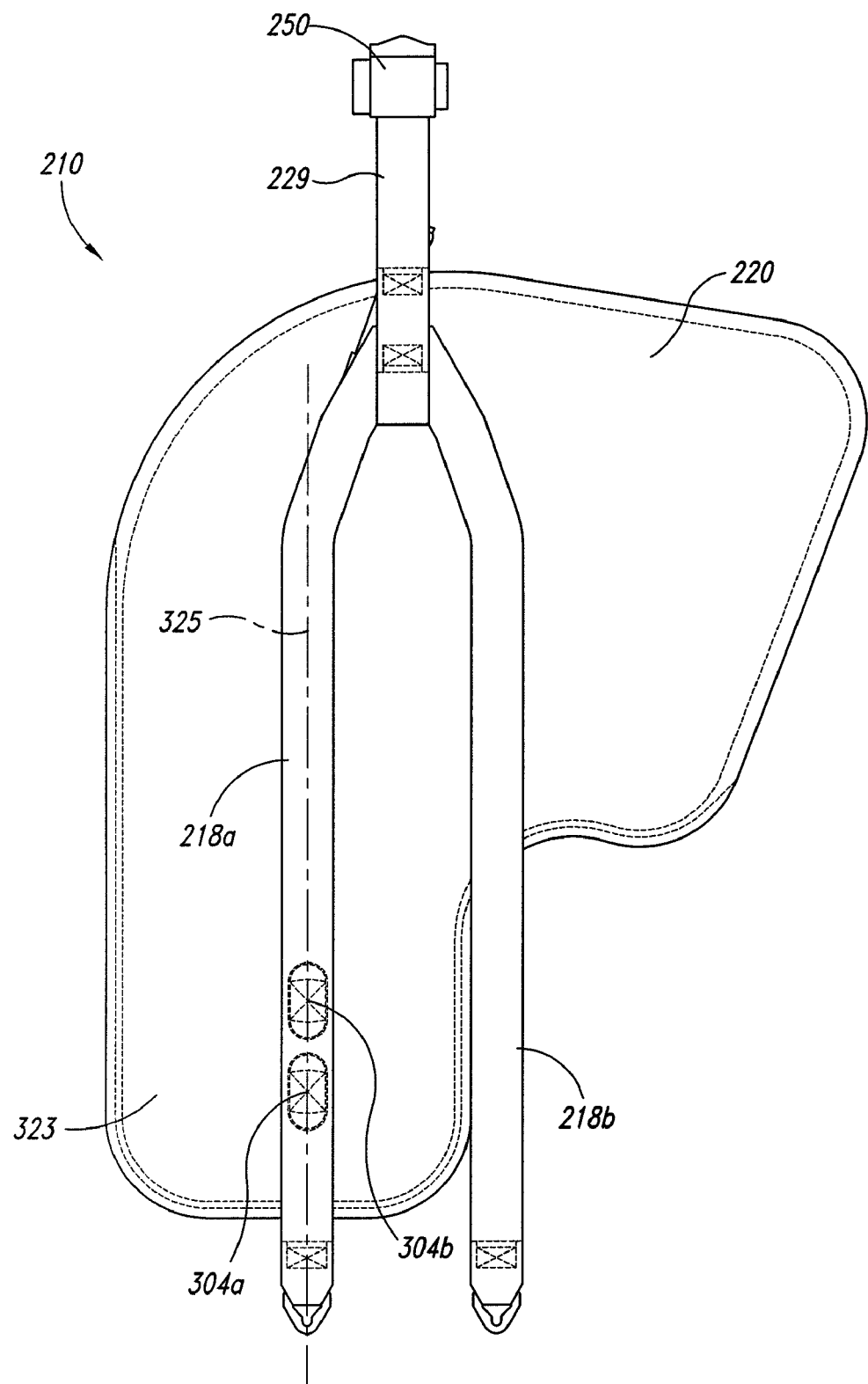
FIG. 3C is an underside view of the personal restraint system of FIG. 3A.

FIG. 3C is an underside view of the restraint system 210 illustrating the attachment of the airbag 220 to the first shoulder web 218a. In the illustrated embodiment, the airbag 220 is sewn or otherwise attached to the first shoulder web 218a at multiple attachment sites 304 (identified individually as a first attachment site 304a and a second attachment site 304b). In certain embodiments, the airbag 220 can be laterally offset the first shoulder web 218a for the purpose of directing and/or rotating the airbag 220 in a predetermined direction during inflation. For example, in one embodiment, the attachment sites 304 can be offset from a centerline 325 of a lower portion 323 of the airbag 220 to direct the airbag 220 in one direction during deployment. Moreover, although two attachment sites 304 are shown in FIG. 3C, in other embodiments the airbag 220 can be attached to the web 218a and/or to other webs (e.g., shoulder webs, lap webs, crotch webs, etc.) at other locations.

Figure 4:
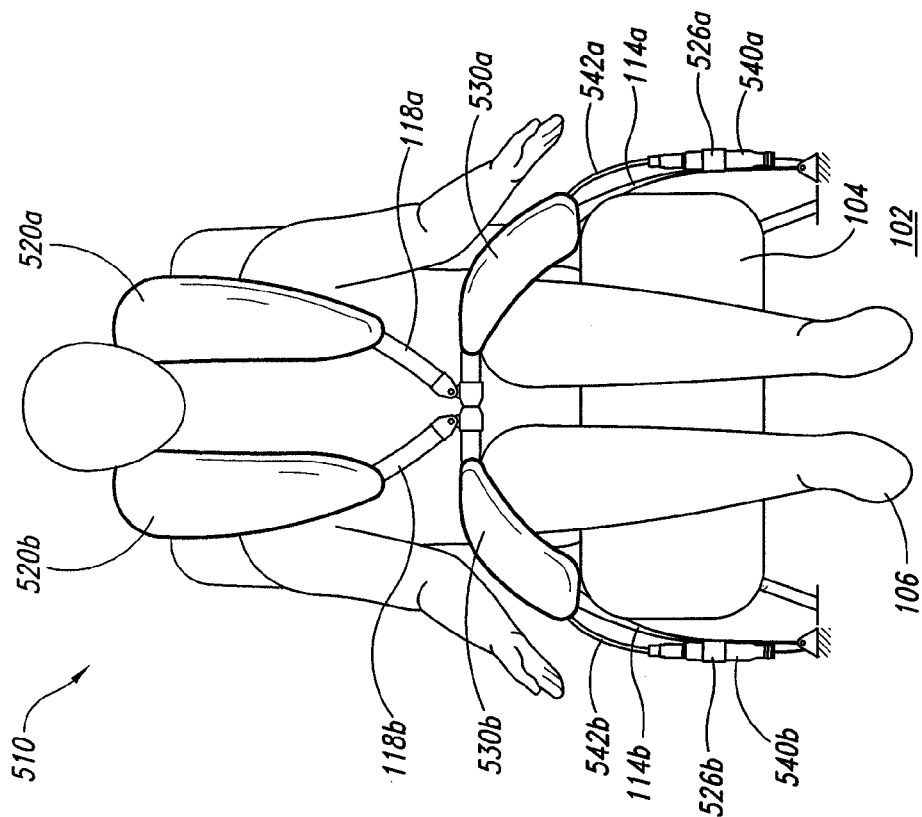
FIGS. 4 and 5 are front views of a vehicle occupant positioned in various restraint systems configured in accordance with different embodiments of the disclosure.
Figure 5:
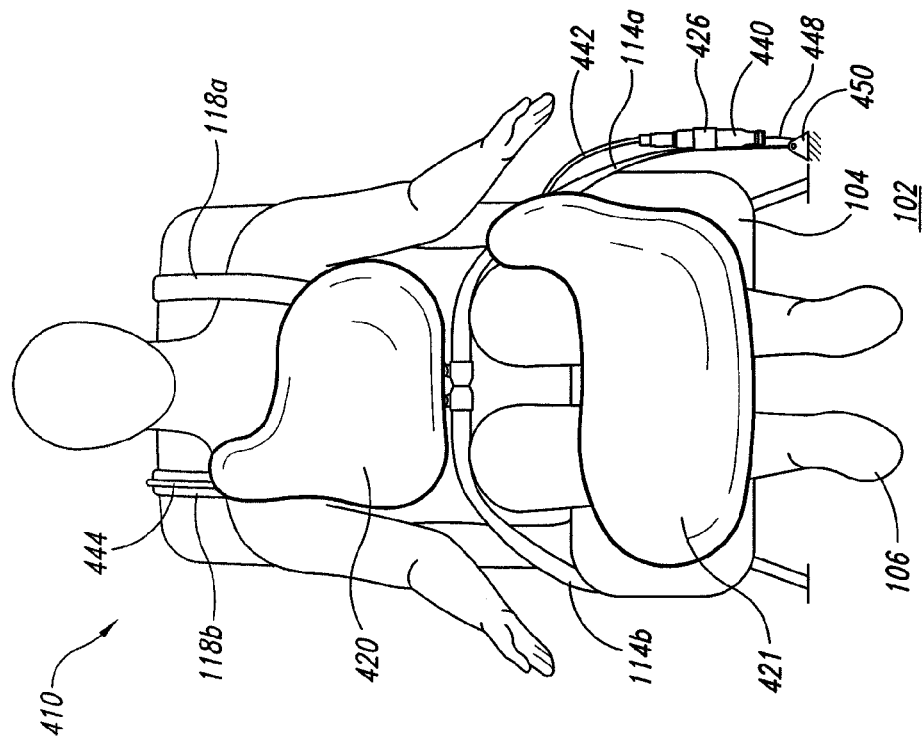

FIGS. 4 and 5 are front views of the occupant 106 positioned in various restraint systems configured in accordance with other embodiments of the disclosure. In the embodiments illustrated in FIGS. 4 and 5, the restraint systems include several features that are at least generally similar in structure and function to those of the restraint systems described in detail above with reference to FIGS. 1A-3C. For example, the restraint systems illustrated in FIGS. 4 and 5 include airbags and inflators that are carried by portions of adjacent webs. As described in detail below, however, these embodiments can include airbags that are carried on other webs and can inflate in different positions relative to the occupant 106.

In the embodiment illustrated in FIG. 4, a restraint system 410 includes an upper airbag 420 and a lower airbag 421. The lower airbag 421 is carried by the first lap web 114a and deployed toward the legs of the occupant 106. In the illustrated embodiment, the first lap web 114a is secured to the vehicle 102 with an anchor 450. For purposes of illustration, the anchor 450 is positioned to one side of the seat 104. In other embodiments, however, the first lap web 114a can be secured to the vehicle 102 at other locations (e.g., on the seat 104, behind the seat 104, etc.). Moreover, the first lap web 114a can also be operably coupled to a retractor or other anchor-type structure.

The first lap web 114a also carries a lower inflator 440 operably coupled to the lower airbag 421 with a lower gas tube 442. In the illustrated embodiment, the lower inflator 440 is at least partially secured to the first lap web 114a with a loop of material or sleeve 426. An electrical link 448 extends from the lower inflator 440 to an electronics module (not shown in FIG. 4) that includes one or more sensors to activate the lower inflator 440 in response to a dynamic event (e.g., a rapid deceleration, acceleration, etc.). The restraint system 410 can also include a cover or housing (not shown in FIG. 4) positioned over the lower inflator 440 and at least a portion of the lower gas tube 442 to at least partially retain and/or conceal the lower inflator 440 on the first lap web 114a.

The upper airbag 420 can be carried by the second shoulder web 118b and deployed toward the abdomen of the occupant 106. The upper airbag 420 can be operably coupled to an upper inflator (not shown in FIG. 4) carried by the second shoulder web 118b. For example, an upper gas tube 444 extending along the second shoulder web 118b operably couples the upper airbag 420 to the upper inflator carried by the second shoulder web 118b at a location behind the occupant 106. The upper inflator can also be operably coupled to an electronics module (not shown in FIG. 4) that includes one or more sensors to activate the upper inflator in response to a dynamic event (e.g., a rapid deceleration, acceleration, collision, impact, etc.). Although not shown in FIG. 4, the electronics module can be generally similar in structure and function to the electronics module 144 described above with reference to FIG. 1C.

FIG. 5 illustrates a restraint system 510 having multiple tubular-shaped airbags that deploy from the different webs. More specifically, the restraint system 510 includes a first lower airbag 530a attached to and deployed from the first lap web 114a, and a second lower airbag 530b attached to and deployed from the second lap web 114b. Each lap web 114 also carries a lower gas tube 542 (identified individually as a first lower gas tube 542a and a second lower gas tube 542b) to operably couple each lower airbag 530 to a corresponding lower inflator 540 (identified individually as a first lower inflator 540a and a second lower inflator 540b). The restraint system 510 also includes a first upper airbag 520a attached to and deployed from the first shoulder web 118a, and a second upper airbag 520b attached to and deployed from the second shoulder web 118b. Each shoulder web 118 also carries an upper inflator and upper gas tube (not shown in FIG. 5) positioned behind the occupant 106. The lower inflators 540 and upper inflators can also be operably coupled to one or more electronics modules (not shown in FIG. 5) and corresponding sensors to activate the inflators in response to a dynamic event (e.g., a rapid deceleration, acceleration, collision, impact, etc.).

In the illustrated embodiment, each of the lower airbags 530 and upper airbags 520 has a generally cylindrical or tubular shape when deployed that extends adjacent to the corresponding web in general alignment therewith. When the tubular airbags are deployed, they put the corresponding webs in tension. For example, as the tubular airbags inflate, their cross-sectional areas increase thereby tensioning the corresponding web. One advantage of the illustrated embodiment is that the tubular airbags provide lateral cushioning and stabilization for the occupant 106 during a rapid deceleration or other type of dynamic event. Moreover, each tubular airbag can provide an increased surface area of the corresponding web that contacts the occupant 106. The increased surface area can evenly distribute the force exerted by the corresponding web against the occupant 106 during the deceleration event, thus reducing the localized pressure of the web against the occupant 106.

From the foregoing, it will be appreciated that specific embodiments of the disclosure have been described herein for purposes of illustration, but that various modifications may be made without deviating from the spirit and scope of the various embodiments of the disclosure. For example, the restraint systems can include airbags deploying in other directions than those illustrated in the Figures. Moreover, the restraint systems can also deploy from webs other than the illustrated shoulder and lap webs, including, for example, crotch webs. In addition, the restraint systems can also be used with different inflator systems. Further, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

We claim:

1. A personal restraint system for use with an occupant seated in a vehicle, the personal restraint system comprising:
   a first shoulder web having an end portion operably coupled to the vehicle, wherein the first shoulder web is configured to extend over a first shoulder of the occupant when the occupant is seated in the vehicle;
   a second shoulder web configured to extend over a second shoulder of the occupant;
   an airbag carried by the first shoulder web; and
   a gas source carried by the first shoulder web and operably coupled to the airbag, wherein the gas source is configured to inflate the airbag, wherein the inflated airbag has a generally inverted "L" shape with a first bag portion and a second bag portion, wherein the first bag portion extends in a generally vertical direction adjacent to the first shoulder web when inflated, and wherein the second bag portion extends outwardly from the first bag portion in a generally lateral direction in front of the upper torso and head of the occupant when inflated, and wherein the second bag portion extends across the second shoulder web when inflated.

2. The personal restraint system of claim 1, further comprising a web retractor operably coupled to the first shoulder web to adjust tension of the first shoulder web, wherein the gas source is positioned between the airbag and the retractor.

3. The personal restraint system of claim 1 wherein the gas source is spaced apart from the airbag.

4. The personal restraint system of claim 1, further comprising a cover positioned over a portion of the first shoulder web and the inflator, wherein the cover at least partially retains the inflator on the first shoulder web.

5. The personal restraint of claim 1 wherein the first bag portion has a generally tubular shape extending adjacent to a portion of the first shoulder web when inflated.

6. The personal restraint system of claim 1 wherein the airbag is a first airbag and the gas source is a first gas source, and wherein the personal restraint system further comprises:
   a third web having a second end portion operably coupled to the vehicle, wherein the third web is configured to extend around at least a portion of the occupant when the occupant is seated in the vehicle;
   a second airbag carried by the third web; and
   a second gas source carried by the third web and operably coupled to the second airbag, wherein the second gas source is configured to inflate the second airbag.

7. The personal restraint system of claim 1, further comprising:
   a sensor; and
   an electrical link operably coupling the sensor to the gas source, wherein the sensor is configured to transmit a signal to the gas source via the electrical link in response to a rapid deceleration of the vehicle, and wherein the gas source is configured to dispense gas into the airbag in response to the signal.

8. A personal restraint system for use with an occupant in a vehicle, the personal restraint system comprising:
   a web retractor attached to the vehicle;
   a first shoulder web having an end portion operably coupled to the retractor, wherein the first shoulder web is configured to extend around at least a portion of the occupant when the occupant is seated in the vehicle;
   a second shoulder web;
   an airbag carried by the first shoulder web;
   an inflator carried by the first shoulder web;
   a fluid conduit operably coupled between the airbag and the inflator; and
   a sensor operably coupled to the inflator, wherein the sensor is configured to transmit a signal to the inflator in response to a rapid deceleration of the vehicle, and wherein the inflator is configured to dispense gas into the airbag through the conduit in response to the signal, wherein the airbag includes a first bag portion and a second bag portion, wherein the first bag portion is attached to the first shoulder web and inflates in a generally upward direction adjacent to the first shoulder web, wherein the second bag portion inflates in a generally lateral direction from the first bag portion in front of the upper torso and head of the occupant, and wherein the second bag portion inflates laterally across the second shoulder web.

9. The personal restraint system of claim 8 wherein the inflator is carried by the first shoulder web at a location positioned between the airbag and the retractor.

10. The personal restraint system of claim 8 wherein the vehicle is an aircraft and the web retractor is attached to an interior portion of the aircraft.

11. A personal restraint system for use with an occupant in a vehicle, the personal restraint system comprising:
   a first shoulder web, wherein the first shoulder web is configured to extend around at least a portion of the occupant when the occupant is seated in the vehicle;
   a second shoulder web;
   an airbag carried by the first shoulder web;
   an inflator;
   a fluid conduit operably coupled between the airbag and the inflator;
   a sensor; and
   an electrical link operably coupling the sensor to the inflator, wherein the sensor is configured to transmit a signal to the inflator via the electrical link in response to a rapid deceleration of the vehicle, and wherein the inflator is configured to dispense gas into the airbag through the conduit in response to the signal, wherein the airbag includes a first bag portion and a second bag portion, wherein the first bag portion is attached to the first shoulder web and inflates in a generally upward direction adjacent to the first shoulder web, wherein the second bag portion inflates in a generally lateral direction from the first bag portion in front of the upper torso and head of the occupant and across the second shoulder web.

12. The personal restraint system of claim 11, further comprising a web retractor attached to the vehicle and operably coupled to the first and second shoulder webs to adjust tension of the first and second shoulder webs.

13. A personal restraint system for use in a vehicle, the personal restraint system comprising:
   first and second shoulder webs for restraining an occupant in the vehicle;
   an airbag attached to the first shoulder web, wherein the airbag has a generally inverted "L" shape when inflated with a first bag portion that extends in a generally vertical direction adjacent to the first shoulder web and a second bag portion that extends from the first bag portion in a generally lateral direction in front of the upper torso and head of the occupant, and wherein the second bag portion inflates laterally across the second shoulder web; and
   means for inflating the airbag in response to a rapid deceleration of the vehicle, wherein the means for inflating the airbag is carried on at least one of the first shoulder web and the second shoulder web.

14. The personal restraint system of claim 13, further comprising a retractor for adjusting tension of the first and second shoulder webs, wherein the means for inflating is carried by the first shoulder web at a position between the airbag and the retractor.

15. A method for restraining an occupant in a vehicle, the method comprising:
   detecting a rapid deceleration of the vehicle; and
   inflating an airbag in response to the detected deceleration, wherein the airbag is carried by a first shoulder web operably coupled to the vehicle, and wherein the airbag is inflated with a gas source carried by the first shoulder web, the airbag having a generally inverted "L" shape when inflated with a first bag portion and a second bag portion, wherein the first bag portion extends in a generally vertical direction adjacent to the first shoulder web when inflated, and wherein the second bag portion extends from the first bag portion in a generally lateral direction in front of the upper torso and head of the occupant and across a second shoulder web when inflated.

16. The method of claim 15 wherein inflating the airbag in response to the detected deceleration includes inflating the airbag with the gas source spaced apart from the airbag.

17. The method of claim 15 wherein inflating the airbag in response to the detected deceleration includes inflating the airbag from the first shoulder web which is operably coupled to a retractor attached to the vehicle, wherein the gas source is positioned between the airbag and the retractor.

* * * * *